UNITED STATES PATENT OFFICE.

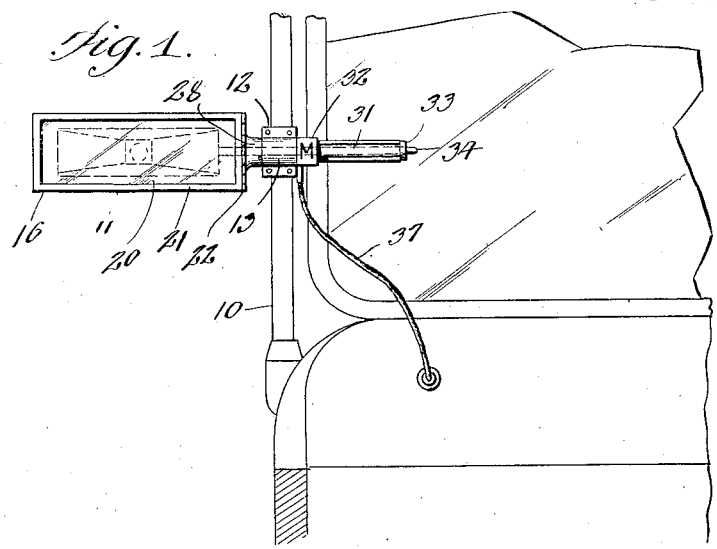
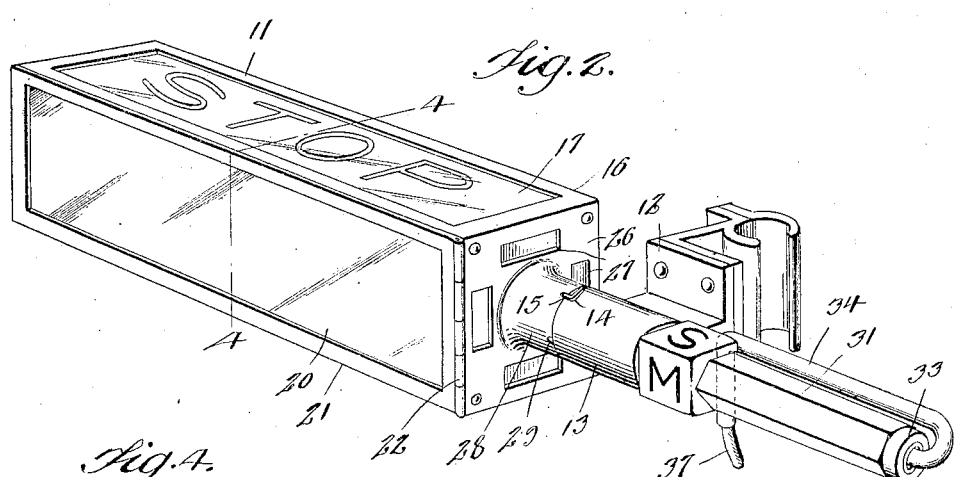
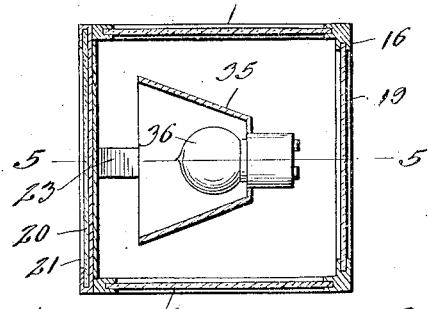

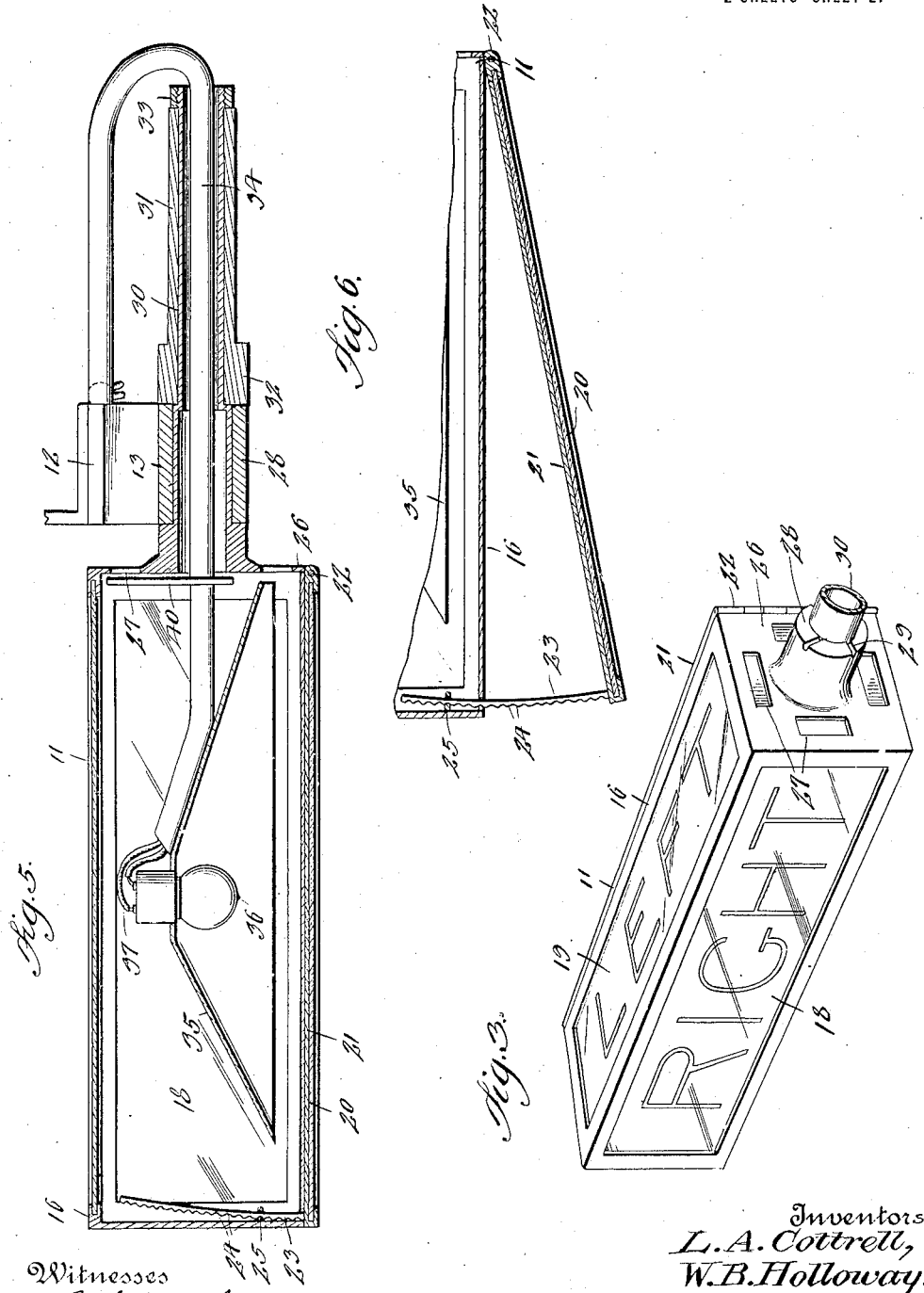

LEON A. COTTRELL AND WILLIAM B. HOLLOWAY, OF WASHINGTON, DISTRICT OF COLUMBIA.

SIGNAL FOR MOTOR-VEHICLES.

1,329,957.  Specification of Letters Patent.  Patented Feb. 3, 1920.

Application filed March 1, 1918. Serial No. 219,830.

*To all whom it may concern:*

Be it known that we, LEON A. COTTRELL and WILLIAM B. HOLLOWAY, citizens of the United States, residing at Washington, District of Columbia, have invented new and useful Improvements in Signals for Motor-Vehicles, of which the following is a specification.

This invention relates to an improved direction signal for vehicles.

In carrying out our invention it is our purpose to produce a simple, cheap and thoroughly effective device which may be easily and quickly positioned on any ordinary automobile or like vehicle, and which may be easily operated to indicate to other vehicles or to pedestrians to the rear of the vehicle, the course of travel the vehicle is to pursue.

It is also our purpose to produce a direction signal for vehicles including a revoluble member having means for holding the same against turning, said member being square in cross section and having three of its faces provided with transparent indicia and its remaining face provided with a reflective surface, which latter being provided with means whereby the same may be retained at desired angles with respect to the member whereby, when the device is brought to one position, the driver may observe vehicles or pedestrians to the rear of his machine and when the device is brought to other positions the indicia on the faces thereof will indicate to the rear of the machine the intended path of travel thereof, that is if the machine is to be brought to a stop, or is to be steered to the right or to the left of a direct course, while suitable means is provided for illuminating the signal to render the same effective at night.

A further object of the invention is to provide an indicating signal of this character with means arranged adjacent to the operating handle thereof for indicating to the driver the position of the signaling surface of the device.

Other objects and advantages will appear as the nature of the invention is better understood, reference being had to the accompanying drawings, in which:

Figure 1 is a perspective view illustrating the application of the improvement.

Fig. 2 is an enlarged perspective view of the improvement detached.

Fig. 3 is a similar view but showing the signal turned to bring other faces than that illustrated in Fig. 2, to signaling position.

Fig. 4 is an approximately central transverse sectional view through the signal, approximately on the line 4—4 of Fig. 2.

Fig. 5 is a longitudinal sectional view approximately on the line 5—5 of Fig. 4.

Fig. 6 is a detail view illustrating the manner of holding the reflective plate or surface against the casing or at an angle with respect to the casing.

In the drawings we have illustrated the improvement applied to the upper edge of the side of an automobile, forward of one of the front doors, but it is to be understood that the device may be attached to other parts of the machine, as for instance to the dash, instrument board or wind shield. The device also is not to be understood as restricted to use upon an automobile, as the same may be attached to other vehicles upon which direction signals are desired.

In the drawings the numeral 10 designates a portion of an automobile body, and the numeral 11 indicates our improvement in its entirety.

On the automobile body is secured a bracket 12 that is provided with a longitudinally arranged barrel 13. The barrel, on its outer end is formed with a depression 14 within which is secured a spring catch 15.

The casing of the signal is in the nature of a rectangular frame having closed ends. The faces of the frame 16 are also closed by plates which are preferably removably secured to the frame. Four of these plates are, of course, employed and upon the plates 17, 18 and 19 is arranged suitable indicia. The plates may be of transparent material, painted or otherwise coated to destroy the transparency thereof, the indicia being inscribed directly on the coated surfaces so that only such parts of the plates are thus rendered transparent. On the plate 17 the word "Stop" is inscribed. On the plate 18 the word "Left" is inscribed, while on the plate 19 the word "Right" is inscribed. The remaining plate is indicated by the numeral 20 and is in the nature of a mirror or other suitable reflective surface. This plate 20 has its edges received in a suitable frame 21, the said frame being hinged at the outer end thereof to the casing frame 16, as indicated by the numeral 22. On the auxiliary frame 21 is secured a curved arm 23 that preferably has its under face roughened or serrated as at 24, and this arm 23 plays through and is frictionally contacted by a spring, preferably substantially U-shaped bail or keeper 25 secured in the casing frame 16. By this arrangement it will be noted that the transparent plate 20 may be held against the frame 16 or may be arranged at any desired angle with respect to the said frame when the plate is swung upon its hinge, and retained at such angular relation to the frame. This is an important feature of the invention as when the transparent plate is brought directly opposite the driver of the automobile (which is the normal position of the signal) the driver can not only observe vehicles or pedestrians directly to the rear of his machine, but may observe traffic conditions at an angle from his machine.

The rear end of the frame or casing 16 is indicated for distinction by the numeral 26 and is provided, adjacent to the edges thereof with slots or openings 27, one for each of the indicating plates and one for the reflective plate. The said rear or inner end 26 has centrally formed thereon a round boss 28 which has its outer face provided with four spaced notches 29, one of said notches being arranged central with respect to the indicating plates and to the reflector plate. These notches are designed to be engaged by the spring catch 15 of the barrel 13 to lock the device in desired positions with respect to the bracket and to hold the signal against accidental turning on the bracket.

On the outer face of the boss 28 is formed a tubular sleeve 30 that has a bearing in the bore of the barrel 13 and projects a suitable distance beyond the bracket, and the outer end of the tubular member 30 is preferably threaded. On the tube 30 the operating handle 31 is arranged, the same having a central bore receiving the tube and having its inner end formed with or connected thereto a square block or head 32. The sides or faces of this head 32 are disposed in a line with the indicating plates and the reflector plate of the signal and are suitably inscribed. The side or face of the head opposite the reflector plate has inscribed thereon the letter "N," that opposite the "Stop" plate the letter "S," that opposite the "Left" plate the letter "L," and that opposite the "Right" plate, the letter "R." These letters being the initial letters of the mirror or reflector and the indicia on the indicator plates serve as a means whereby the operator can determine the position of the signal during the operation thereof by the turning of the handle 31. The handle 31 is engaged by a nut 33 that is screwed on the outer end of the tube 30 and contacts with the outer end of the handle holding the handle locked to the tube. Any desired means may be employed, if found necessary, for locking the nut 33 to the tube or to the handle, and the handle, as disclosed by the drawings, may have an outer irregular perimeter so that the same may be firmly grasped and turned by the operator.

Passing through the tube 30 and entering the indicator casing or frame 16 is a pipe 34. The portion of the pipe outward of the device is preferably bendable so that the same may be bent to the shape illustrated by the drawings, but, if desired, the said outer portion of the pipe may be formed as shown by the drawings. The pipe is held, in any desired or preferred manner against turning, or against movement in any direction, and has its inner end connected with the rear face of a lamp casing 35. The casing 35 is substantially rectangular in plan and has its sides and ends inclined inwardly to the rear thereof. The outer surface of these inclined portions is highly polished to provide a reflector for the rays of light from a lamp bulb 36 that is centrally secured in the lamp casing 35. The wires 37 for the lamp bulb are directed through the pipe 34 to a suitable source of energy (not shown), and the said wires are under the control of a suitable switch (not shown).

The rays from the lamp bulb will be deflected from the reflector through the transparent parts of the plates 17, 18 and 19 and likewise through the openings 27, so that portions of said rays will be diffused over the head 32 of the handle 31, illuminating the letter or character on the head permitting the operator to bring the proper signaling surface to position. If desired, and as illustrated by the drawings the pipe 34 may have secured thereon a shutter plate 40 that is designed to close all but one of the openings 27, the unobstructed opening being arranged directly in front of the driver and directly opposite the signaling or reflector plate.

It is believed, from the foregoing description that the simplicity and advantages of the construction will be fully apparent to those skilled in the art to which such devices appertain.

Having thus described the invention, what we claim is:

1. In a signaling device, a rectangular frame comprising a casing, signaling plates on certain of the faces of the frame, a reflector plate hingedly secured to the remaining face of the frame, means comprising a curved arm and an element engaging therewith for locking the plate to the frame or for holding the plate at an angle with respect to the frame, a support for the frame, and means for turning said frame in said support.

2. In a signaling device, a substantially rectangular frame, plates having indicia thereon closing three of the faces of the frame, a reflector plate hingedly secured to the remaining face of the frame, a curved serrated arm on the said reflector plate, a spring clamp carried by the frame engaging said arm whereby to hold the reflector plate against or at an angle with respect to the frame, a bearing for the frame, and means for normally preventing the turning of the frame in the bearing.

3. In a signaling device for vehicles, a bracket secured to the vehicle, a frame comprising a casing having signal plates on certain of the faces thereof and a reflector plate on the remaining surface thereof, a boss on the end of the casing, a tube co-extensive with said boss and passing through the bracket, means between the bracket and the boss for holding the casing in certain positions against accidental turning when certain of the plates are brought to signaling position, and an operating handle secured to the tube.

4. In a signaling device for automobiles or the like, a bracket secured to said automobile and having a longitudinal barrel, a spring catch at one end of the barrel, a casing having signal plates thereon, a boss on one end of the casing having spaced notches arranged centrally of the respective signal plates, a tube co-extensive with the boss and journaled in the barrel of the bracket, a handle on the tube, securing means therefor to bring one end thereof in contact with the boss, and the referred to catch on the barrel designed to engage in the notches of the boss.

5. In a signaling device for automobiles or the like, a hollow casing having signal plates and a reflector plate on the faces thereof, the closed inner end of the casing having slots opposite said plates, a lamp in said casing, a boss on the slotted end of the casing, said end having openings therein opposite the plates, a tubular member co-extensive with the boss, a bracket providing a bearing for said tube, a handle on said tube, securing means between the handle and tube whereby to bring the handle in contact with the bracket, a head on the handle having indicia on the faces thereof, and spring means between the bracket and boss for holding the casing against accidental rotary movement and for locking the casing on the boss when the said casing is brought to certain positions with respect to the boss.

6. In a manually operated signal for vehicles, a bracket having a barrel thereon secured to the vehicle, a spring catch on one end of the barrel, a casing having signal plates and a reflector plate on the faces thereof and having its ends closed, one of said ends having openings in a line with the plates, a boss on said end having notches therein, a tube co-extensive with the boss and bearing in the barrel of the bracket, a tubular handle on the tube, a head on the inner end of said handle having a plurality of faces corresponding in number with the plates on the casing and said faces having indicia thereon corresponding to the indicia on the signal plates, means for locking the handle to the tube, a lamp casing in the signal casing, a lamp therefor, a pipe member extending through the tube and supporting the lamp casing and providing a conductor for the wires for the lamp, and the referred to catch on the barrel adapted to engage with the notches in the boss, when the handle is turned to bring the casing to certain positions.

7. A signaling device comprising a casing having signal plates and a reflector plate thereon, a lighted element in said casing, a reflector therefor for directing the rays of light toward the signal plates or reflector plate, said casing having openings in one of the ends thereof corresponding in number with the respective signal plates and reflector plate, means for turning the casing to bring the signal plates to signaling position, and a shutter for closing all of the referred to openings except that adjacent the plate that has been brought into signaling position.

In testimony whereof we affix our signatures.

LEON A. COTTRELL.
WILLIAM B. HOLLOWAY.